United States Patent
Ramaswamy et al.

(10) Patent No.: US 9,451,323 B2
(45) Date of Patent: Sep. 20, 2016

(54) METHODS AND APPARATUS TO MEASURE AN AUDIENCE OF AN ONLINE MEDIA SERVICE

(71) Applicant: The Nielsen Company (US), LLC, Schaumburg, IL (US)

(72) Inventors: Arun Ramaswamy, Tampa, FL (US); Jan Besehanic, Richardson, TX (US)

(73) Assignee: The Nielsen Company (US), LLC, New York, NY (US)

( * ) Notice: Subject to any disclaimer, the term of this patent is extended or adjusted under 35 U.S.C. 154(b) by 46 days.

(21) Appl. No.: 14/140,145

(22) Filed: Dec. 24, 2013

(65) Prior Publication Data

US 2015/0181290 A1    Jun. 25, 2015

(51) Int. Cl.

| | |
|---|---|
| *H04H 60/32* | (2008.01) |
| *H04N 21/442* | (2011.01) |
| *H04N 21/45* | (2011.01) |
| *H04N 21/441* | (2011.01) |
| *H04H 60/31* | (2008.01) |
| *H04N 21/266* | (2011.01) |
| *H04N 21/658* | (2011.01) |
| *H04H 60/66* | (2008.01) |

(52) U.S. Cl.
CPC ........ *H04N 21/44222* (2013.01); *H04H 60/31* (2013.01); *H04N 21/266* (2013.01); *H04N 21/441* (2013.01); *H04N 21/44204* (2013.01); *H04N 21/4532* (2013.01); *H04N 21/6582* (2013.01); *H04H 60/66* (2013.01)

(58) Field of Classification Search
USPC .................................. 725/9, 11, 14, 16, 110
See application file for complete search history.

(56) References Cited

U.S. PATENT DOCUMENTS

| | | | |
|---|---|---|---|
| 6,691,155 B2 | 2/2004 | Gottfried | |
| 7,370,276 B2 | 5/2008 | Willis | |
| 8,000,993 B2 | 8/2011 | Harvey et al. | |
| 8,060,398 B2 | 11/2011 | Canning et al. | |
| 8,239,889 B2 | 8/2012 | Wong et al. | |
| 8,453,173 B1 | 5/2013 | Anderson et al. | |
| 2008/0270358 A1 | 10/2008 | Chatow et al. | |
| 2011/0251988 A1 | 10/2011 | Pronk et al. | |
| 2012/0311103 A1 | 12/2012 | Kunigita et al. | |
| 2013/0097101 A1* | 4/2013 | Ortiz ............................... | 706/11 |
| 2013/0325942 A1 | 12/2013 | Chen et al. | |
| 2014/0215506 A1* | 7/2014 | Kalmes et al. .................. | 725/14 |
| 2014/0280874 A1* | 9/2014 | Bosworth ............... | H04L 67/22 709/224 |

FOREIGN PATENT DOCUMENTS

WO    2008051872 A1    5/2008

OTHER PUBLICATIONS

International Searching Authority, "International Search Report", issued in connection with PCT patent application No. PCT/US2014/066929, mailed on Feb. 11, 2015, 3 pages.

International Searching Authority, "Written Opinion", issued in connection with PCT patent application No. PCT/US2014/066929, mailed on Feb. 11, 2015, 9 pages.

Pyflix2:python module fro accessing Netflix webservice, 9 pages.

* cited by examiner

*Primary Examiner* — Mulugeta Mengesha

(74) *Attorney, Agent, or Firm* — Hanley, Flight & Zimmerman, LLC (57) ABSTRACT

Methods, apparatus, systems and articles of manufacture are disclosed to measure an audience of an online media service. An example method includes requesting an access history associated with a subscriber of an online media service using a programming interface for the online media service; and determining ratings information using the access history and demographic information corresponding to the subscriber.

19 Claims, 6 Drawing Sheets

SUBSCRIBER INFORMATION
FILE
⟵ 300

- user
- 302 ⟶ user_id
    T1DZVb5J81s9WbOqRioRR3Vy0TtNN7bnwKLyzK2lUwAZc-
- 304 ⟶ first_name
    Vicki
- 306 ⟶ last_name
    Klotz
- 308 ⟶ nickname
    oaf1470199
- 310 ⟶ can_instant_watch
    true
- 312 ⟶ preferred_format
    category
        @scheme=http://api.netflix.com/categories/title_formats
        @label=Blu-ray
        @term=Blu-ray
    category
        @scheme=http://api.netflix.com/categories/title_formats
        @label=DVD
        @term=DVD
- 314 ⟶ link
    @href=http://api.netflix.com/users/T1DZVb5J81s9WbOqRioRR3Vy0TtNN7bnwKLyzK2lUwAZc-/queues
    @rel=http://schemas.netflix.com/queues
    @title=queues
- 316 ⟶ link
    @href=http://api.netflix.com/users/T1DZVb5J81s9WbOqRioRR3Vy0TtNN7bnwKLyzK2lUwAZc-/rental_history
    @rel=http://schemas.netflix.com/rental_history
    @title=rental history

FIG. 3

MEDIA ACCESS HISTORY FILE
/— 400

402 — url_template
  http://api.netflix.com/users/T1DZVb5381s9WbOqRlaRR3Vy0TNx7bmvKLy2K2UvaZc-/rental_history{{-join}{&start_index|max_results}}
404 — number_of_results
  470
406 { start_index
  0
  results_per_page
  25
408 — rental_history_item
  id
    http://api.netflix.com/users/T1DZVb5381s9WbOqRlaRR3Vy0TNx7bmvKLy2K2UvaZc-/rental_history/watched/70130723
  watched_date
    1286288369
  viewed_time
    01:15:12
  updated
    1286288369
  category
    @scheme=http://api.netflix.com/categories/rental_states
    @label=Watched
    @term=Watched
  link
    @href=http://api.netflix.com/catalog/titles/movies/70130723
    @rel=http://schemas.netflix.com/catalog/title
    @title=Justice League: Crisis on Two Earths
  title
    @short=Justice League: Crisis on Two Earths
    @regular=Justice League: Crisis on Two Earths
  box_art
    @small=http://cdn-3.nflximg.com/us/boxshots/tiny/70130723.jpg
    @medium=http://cdn-3.nflximg.com/us/boxshots/small/70130723.jpg

METHODS AND APPARATUS TO MEASURE AN AUDIENCE OF AN ONLINE MEDIA SERVICE

FIELD OF THE DISCLOSURE

This disclosure relates generally to audience measurement, and, more particularly, to measuring an audience of an online media service.

BACKGROUND

Subscribers to a particular media provider or online media service may access media through any of a plurality of electronic devices (e.g., televisions, smartphones, tablets, computers, radios, etc.). Traditionally, subscribers have accessed media on media renderers (e.g., televisions) via broadcast and/or subscriptions to a particular media provider (e.g., cable television, satellite television, etc.). Recently, web services (e.g., Netflix, Hulu, YouTube, etc.) have enabled access to media "on demand" through application programming interfaces (API) stored on electronic devices (e.g., televisions, set-top boxes, smartphones, game consoles, etc.) and/or web APIs via the Internet.

BRIEF DESCRIPTION OF THE DRAWINGS

Wherever appropriate, the same reference numbers will be used throughout the drawing(s) and accompanying written description to refer to the same or like parts.

DETAILED DESCRIPTION

Media providers are increasingly using web services as a vehicle for distributing media to subscribers. An online media service (e.g., Netflix, YouTube, etc.) typically includes an application programming interface (API) or Web API that is accessed via Hypertext Transfer Protocol (HTTP) or Secure Hypertext Transfer Protocol (HTTPS) and executed on a remote system, hosting the requested services. Subscribers to an online media service may access the online media service via API(s) and/or server(s) to view media on-demand. The online media service may monitor and/or store a subscriber's access history in a server operated by the online media service. As used herein, a subscriber may be any person having access to an account associated with an online media service.

Example methods, apparatus, and/or articles of manufacture disclosed herein involve requesting an access history associated with a subscriber of an online media service using a programming interface for the online media service and determining ratings information using the access history. Examples disclosed herein further involve obtaining an identification of a subscriber corresponding to an online media service and obtaining permission from the subscriber to access the access history.

Figure 1:
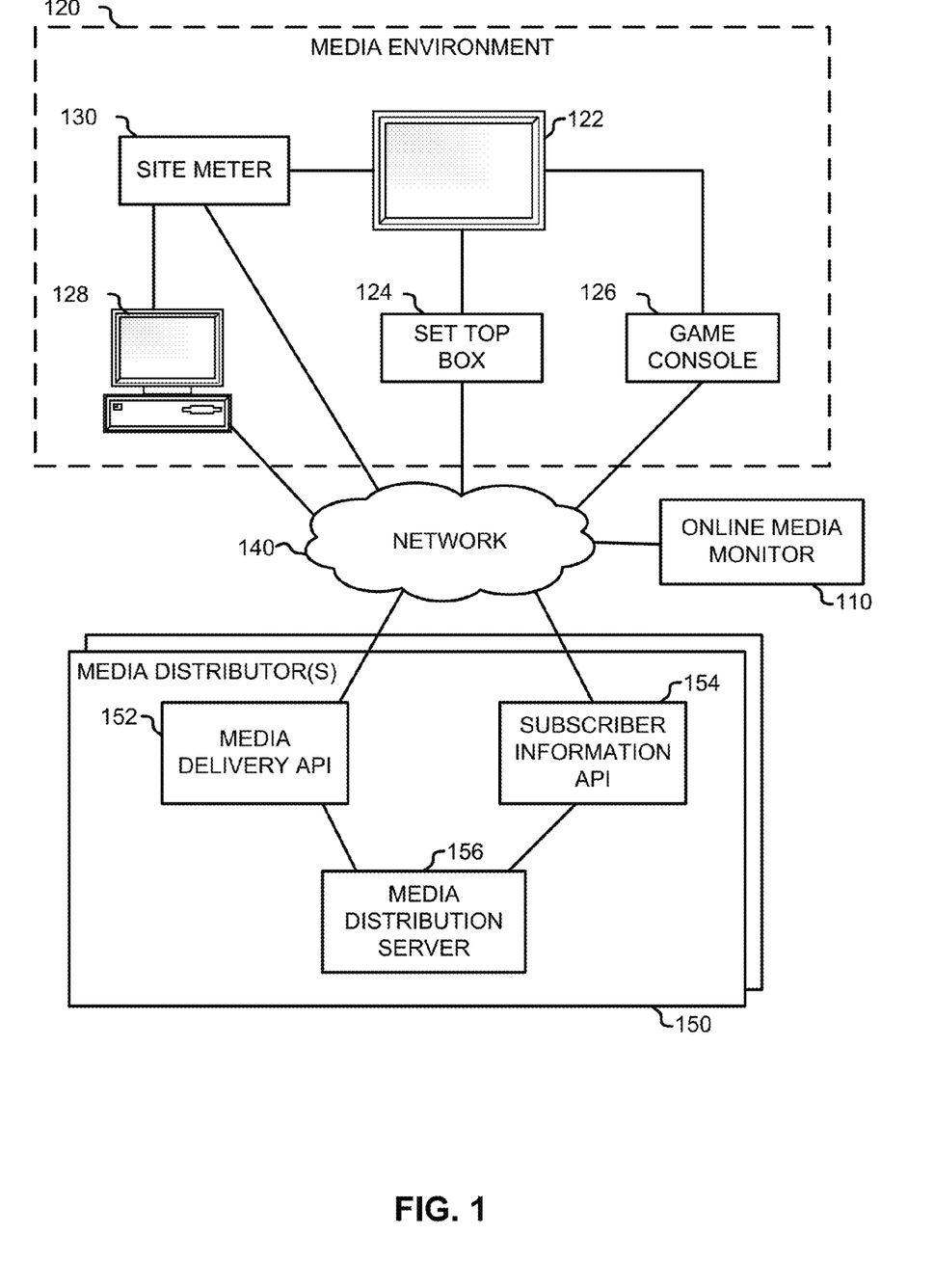
FIG. 1 illustrates an example audience measurement system including an example online media monitor constructed in accordance with the teachings of this disclosure.

FIG. 1 illustrates an example online media service audience measurement system including an example online media monitor 110 constructed in accordance with the teachings of this disclosure. The example of FIG. 1 illustrates the example online media monitor 110, an example media environment 120, an example network 140, and one or more media distributor(s) 150. It will be understood that this is a simplification and that many instances of some or all of the components of FIG. 1 will likely exist in a given implementation.

The example online media monitor 110 of FIG. 1 monitors media requested via online media services associated with the media distributor(s) 150. An audience measurement entity (e.g., The Nielsen Company, LLC (US)) may be a proprietor of the example online media monitor 110. The monitored media may be presented in an example environment 120. The example media environment 120 may be a home (e.g., a panelist home) or a business (e.g., a restaurant, a bar, a break room, etc.). The example media environment 120 of FIG. 1 includes an example media presentation device 122 (e.g., a television, a smart television, etc.), an example set-top box 124 (e.g., a digital video record (DVR), a service provider receiver, etc.), an example game console 126 (e.g., Microsoft® Xbox®, Sony® PlayStation®, Nintendo® WHO, etc.), an example electronic device 128 (e.g., a laptop computer, a desktop computer, a tablet computer, a smartphone, etc.), and an example site meter 130 (e.g., a personal people meter, a portable meter, an on-device meter (ODM), etc.). The example site meter 130 identifies media presented via the example media presentation device 122 and/or the example electronic device 128 (e.g., via a media application 129). The example devices 122, 124, 126, and/or 128 of the example media environment 120 of FIG. 1 facilitate presentation of media. In some examples, media is downloaded and/or streamed via the example network 140 (e.g., the Internet and/or a network in communication with the Internet). In some examples, media is ordered from the media distributor(s) 150 via requests from the example devices 122, 124, 126, and/or 128 and physically delivered to a subscriber (e.g., on a DVD, on a Blu-Ray disc, on flash memory, or on any other type of physical storage device capable of storing media).

In the illustrated example of FIG. 1, a subscriber requests media from the media distributor(s) 150 via corresponding media applications (e.g., a Netflix application, a YouTube application, a Hulu application, etc.) executing on one of the example devices 122, 124, 126, and/or 128. The example media application sends a request to a corresponding media distributor 150 via the network 140 requesting the media distributor 150 to provide specified media data to the one or more device(s) 122, 124, 126, and/or 128 and/or a physical address of the media environment 120.

The example media distributor 150 (e.g., a proprietor of an online media service, such as Netflix, YouTube, Hulu, etc.) of FIG. 1 include an example media delivery API 152, an example subscriber information API 154, and an example media distribution server 156. In response to receiving a request to electronically send media to one or more of the example devices 122, 124, 126, and/or 128, the media delivery API 152 facilitates transmission of media file(s) including the requested media from the media distribution server 156 to the one or more device(s) 122, 124, 126, and/or 128. In some such examples, the subscriber information API 154 confirms that the requesting device(s) 122, 124, 126, and/or 128 are authorized to receive and/or present the requested media (e.g., confirms username and/or password entered via the requesting device, services payment (e.g., charges a credit card), and/or performs other subscriber verification and/or billing processes) prior to sending the media files. In examples disclosed herein, the subscriber information API 154 facilitates access to subscriber information (e.g., name, age, and/or other demographics), access history information, etc. that is stored and/or maintained by the media distribution server 156. For example, a subscriber or other entity may access a subscriber profile, an access history, etc. stored on the media distribution server via the subscriber information API 154. An example access history may include information associated with media (identified by title, episode, season, etc.) that was requested by a subscriber (identified by a username, given name, etc.) via one or more the devices 122, 124, 126, and/or 128. In some examples, the access history information includes information associated with physical media (e.g., a DVD-video, a Blu-ray video, an audio CD, etc.) that was provided (e.g., shipped by mail, by courier, or by other physical transportation) from the media distributor(s) 150 to a physical location associated with the media environment 120 (e.g., a location identified by a street address).

In the illustrated example of FIG. 1, the online media monitor 110 determines ratings of media presented via the media distributor(s) 150. The example online media monitor 110 of FIG. 1 retrieves access history information via the subscriber information API 154 to determine the ratings. For example, the online media monitor 110 may determine a number of subscriber accounts indicating that media was presented via one or more of the media distributor(s) 150 during a particular period of time (e.g., during a calendar month, week, day, etc.). In some examples, the online media monitor 110 requests permission from subscribers to access the access history of the subscriber's account. In some examples, the online media monitor 110 retrieves subscriber information (e.g., name, demographics, location information, etc.) via the subscriber information API 154. In some examples, the online media monitor 110 determines ratings based on physical media in addition to or as an alternative to determining ratings based on media electronically transmitted to the devices 122, 124, 126, and/or 128 via the network 140.

In some examples, the site meter 130 of FIG. 1 detects media by capturing and/or detecting media identification information (e.g., watermarks, signatures, codes, etc.) associated with the presented media and embedded in audio and/or video of the media. Audio watermarking is a technique used to identify media such as television broadcasts, radio broadcasts, advertisements (television and/or radio), downloaded media, streaming media, prepackaged media, etc. Existing audio watermarking techniques identify media by embedding one or more audio codes (e.g., one or more watermarks), such as media identifying information and/or an identifier that may be mapped to media identifying information, into an audio and/or video component. In some examples, the audio or video component is selected to have a signal characteristic sufficient to hide the watermark. As used herein, the terms "code" or "watermark" are used interchangeably and are defined to mean any identification information (e.g., an identifier) that may be inserted or embedded in the audio or video of media (e.g., a program or advertisement) for the purpose of identifying the media or for another purpose such as tuning (e.g., a packet identifying header). As used herein "media" refers to audio and/or visual (still or moving) content and/or advertisements. To identify watermarked media, the watermark(s) are extracted and used to access a table of reference watermarks that are mapped to media identifying information.

In some examples, upon detection of media from an online media service (e.g., via a watermark, signature, and/or code identifying the online media service), the example site meter 130 sends a notification to the online media monitor 110. For example, the site meter 130 may capture media identification information from an image (e.g., a trademark or logo), video, and/or audio corresponding to a particular online media service that is presented via the device(s) 122, 124, 126, and/or 128 (e.g., the site meter 130 identifies a red "Netflix" logo when a Netflix application is presented via the media presentation device 122) and communicate with the online media monitor 110 via the network 140 to indicate the device(s) 122, 124, 126, and/or 128 are accessing media from one or more of the media distributor(s) 150. In some examples, the site meter 130 determines that captured media identification information is associated with an online media service if the site meter 130 determines that the media identification information is not associated with media received from another type of service (e.g., broadcast service and/or satellite service).

Figure 2:
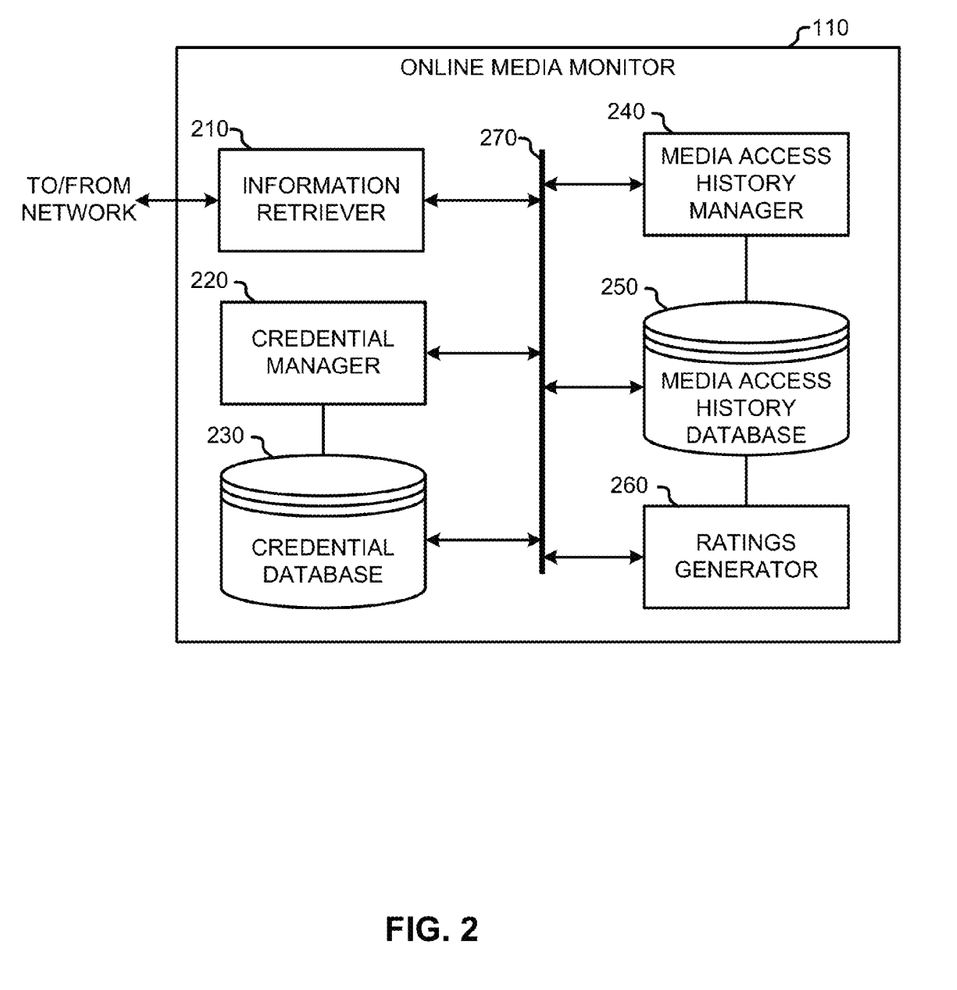
FIG. 2 is a block diagram of an example implementation of the example online media monitor of FIG. 1.

FIG. 2 is a block diagram of an example implementation of the example online media monitor 110 of FIG. 1. The example online media monitor 110 of FIG. 2 includes an example information retriever 210, an example credential manager 220, an example credential database 230, an example media access history manager 240, an example media access history database 250, and an example ratings generator 260. An example communication bus 270 of FIG. 2 facilitates communication between the example information retriever 210, the example credential manager 220, the example credential database 230, the example media access history manager 240, the example media access history 250, and the example ratings generator 260. The example online media monitor 110 of FIG. 2 monitors media provided to subscribers and/or media environments (e.g., the media environment 120 of FIG. 1) via APIs (e.g., the media delivery API 152 and/or the subscriber information API 154). The example online media monitor 110 generates ratings based on information received and/or retrieved from the APIs. In some examples, the information includes subscriber information (e.g., demographics) associated with subscribers that requested and/or accessed media. In some examples, the subscribers are panelists of an audience measurement entity. An audience measurement entity may enlist panelists (e.g., persons agreeing to be monitored) to cooperate in an audience measurement study. The media usage and/or exposure habits of these panelists as well as demographic data about the panelists is collected and used to statistically determine the size and demographics of a larger audience of interest.

The example information retriever 210 of FIG. 2 retrieves information from APIs of media distributor(s). In the illustrated example of FIG. 2, the information retriever 210 communicates with the media delivery API(s) 152 and/or the subscriber information API(s) 154 of one or more of the media distributor(s) 150 via the network 140 of FIG. 1. In some examples, the information retriever 210 communicates (e.g., via online media service applications) with one or more media presentation devices (e.g., the devices 122, 124, 126, and/or 128 of FIG. 1). In some examples, the information retriever 210 communicates with one or more site meter(s) (e.g., the site meter 130 of FIG. 1) in one or more media presentation environment(s).

In some examples, the example information retriever 210 of FIG. 2 requests panelist permission for subscribers via an online media service application executing on a device (e.g., any of the device(s) 122, 124, 126, 128, 130, etc.). In the illustrated example, panelist registration data may be received from a subscriber via a user interface of the media device. For example, in response to determining that an online media service is providing a subscriber with media (e.g., via a notification from the media delivery API 152), the information retriever 210 of the illustrated example requests the subscriber to authorize access to the corresponding subscriber information (e.g., demographics, etc.) and/or access history information via the subscriber information API 154. In some examples, if access history information received from the subscriber information API 154 is associated with a subscriber that is not in the credential database 230 (e.g., a subscriber that has not already authorized access for the data), the credential manager 220 instructs the information retriever 210 to request and/or retrieve subscriber permission to access the subscriber information. In some examples, the subscriber information API 154 of the media distributor 150 facilitates requesting and/or receiving subscriber permission to access (and/or collect) subscriber information and access history information in response to instructions or requests from the online media monitor 110. In some examples, when a subscriber requests and/or installs a site meter (e.g., the site meter 130), the subscriber may provide the appropriate permissions to monitor and/or access media access history of the online media service. In some examples, the information retriever 210 retrieves demographics information of a subscriber from a panelist database of an audience measurement entity that identifies the subscriber and their demographics. Additionally or alternatively, the demographic information may be obtained from the user in any other way (e.g., via a telephone interview, by having the user complete an online survey, etc.). Additionally or alternatively, panelists may be contacted and/or enlisted using any desired methodology (e.g., random selection, statistical selection, phone solicitations, Internet advertisements, surveys, advertisements in shopping malls, product packaging, etc.).

The example information retriever 210 of FIG. 2 facilitates retrieval of information that is to be used to generate ratings associated with media presented via online media services. In some examples, the credential manager 220 of FIG. 2 provides the information retriever 210 with subscriber identification information (e.g. a username, a last name, a subscriber identifier (ID), etc.) stored in the credential database 230 to request information for a particular subscriber. For example, the credential database 230 may store subscriber IDs for particular online media services and/or information indicating whether a subscriber has authorized permission to access their subscriber information (e.g., profile information, demographics, access history, etc.). In some examples, the information retriever 210 retrieves information from a subscriber information API 154 in response to receiving instructions from a user of the online media monitor 110 and/or based on settings of the online media monitor to periodically or aperiodically retrieve information for particular subscribers. In some examples, the information retriever 210 of FIG. 1 retrieves information (e.g., an access history) from a subscriber information API 154 in response to receiving a notification from a site monitor (e.g., the site monitor 130) associated with a particular subscriber ID. In some such examples, the site meter 130 notifies the online media monitor 110 that media from an online media service is being presented in a media environment. In some examples, the information retriever 210 requests information from the subscriber information API 154 using a randomly selected subscriber ID.

The example credential manager 220 of FIG. 2 manages credentials (e.g., subscriber IDs, usernames, first and last names, etc.) of subscribers in the credential database 230. In the illustrated example, the credential manager 220 tracks subscriber IDs, demographics, authorizations, permissions, etc. In some examples, the credential database 230 stores subscriber information associated with subscribers that have authorized the online media monitor 110 to access the subscriber information and/or access history information of the subscribers. Accordingly, in the illustrated example, the credential manager 220 adds new subscriber information to the credential database 230 when authorized subscriber information is not already included in the credential database 230.

Figure 3:
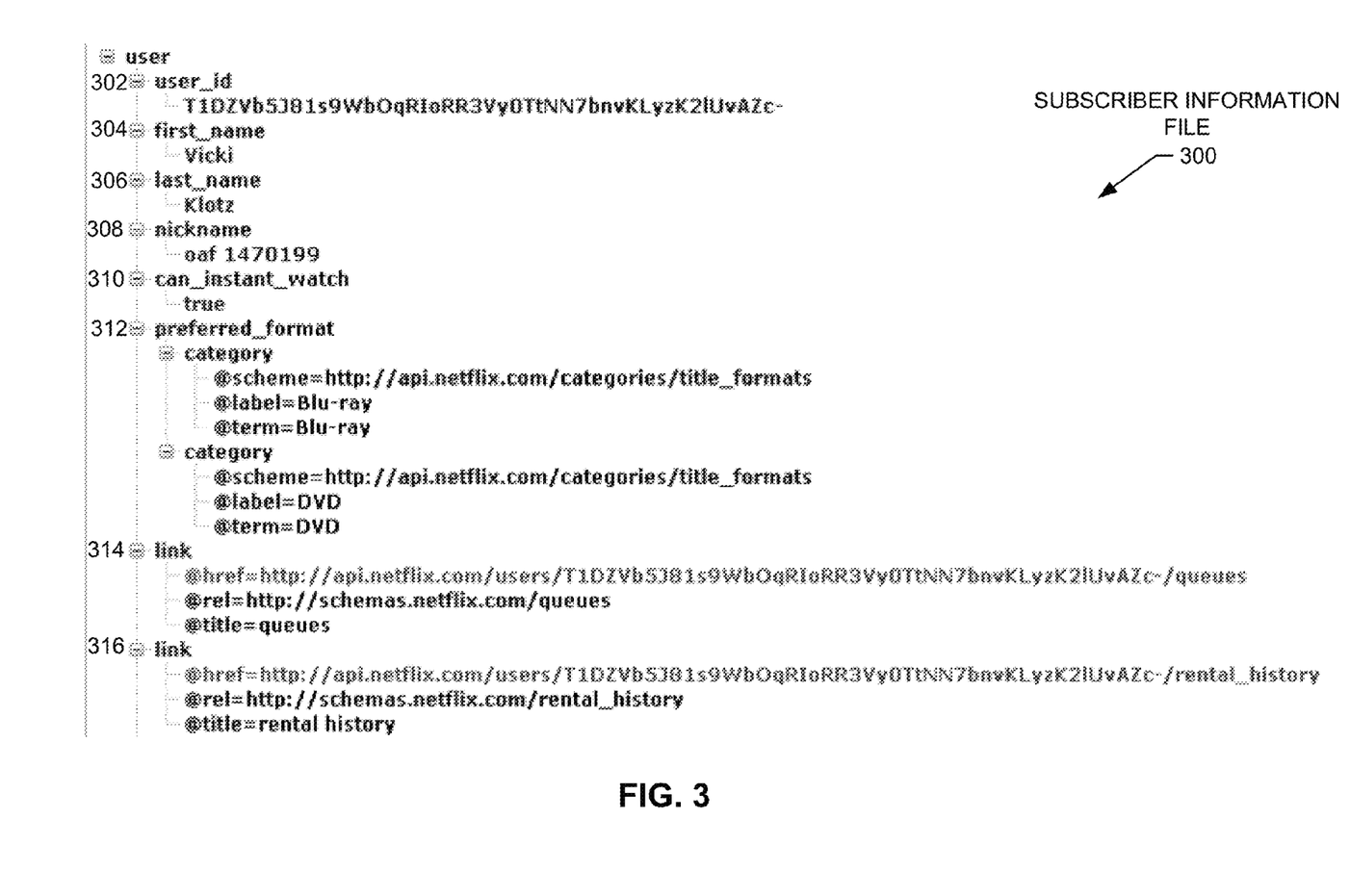
FIG. 3 illustrates an example subscriber information file representative of subscriber information that may be retrieved by the example online media monitor of FIGS. 1 and/or 2.

In some examples, the credential database 230 stores information from a subscriber information file, such as the subscriber information file 300 of FIG. 3, that is retrieved by the information retriever 210 from the subscriber information API 154. The example subscriber information file 300 of FIG. 3 includes a subscriber ID 302, a subscriber's first name 304 and last name 306, a username 308 (e.g., "nickname"), subscriber settings 310 (e.g., "can instant watch"), subscriber preferences 312 (e.g., "preferred format"), etc. In the illustrated example of FIG. 3, the example subscriber information file 300 includes a first link 314 to a subscriber access queue that identifies media that the subscriber has selected for access and a second link 316 to a subscriber access history that identifies media that the subscriber has requested and/or viewed. In some examples, the subscriber information file includes demographic information such as age, race, sex, residence address, etc.

The example media access history manager 240 of FIG. 2 manages access history information retrieved by the information retriever 210. The example media access history manager 240 of the illustrated example manages the access history information using the media access history database 250. The example media access history database 250 stores access history information retrieved by the information retriever 210. In some examples, the media access history manager 240 sorts and/or organizes the media access history database 250 based on media, online media service (e.g., Netflix, Hulu, YouTube, etc.), chronological order, subscriber, location, demographics, media delivery type (e.g., physical, electronic, etc.), etc.

Figure 4:
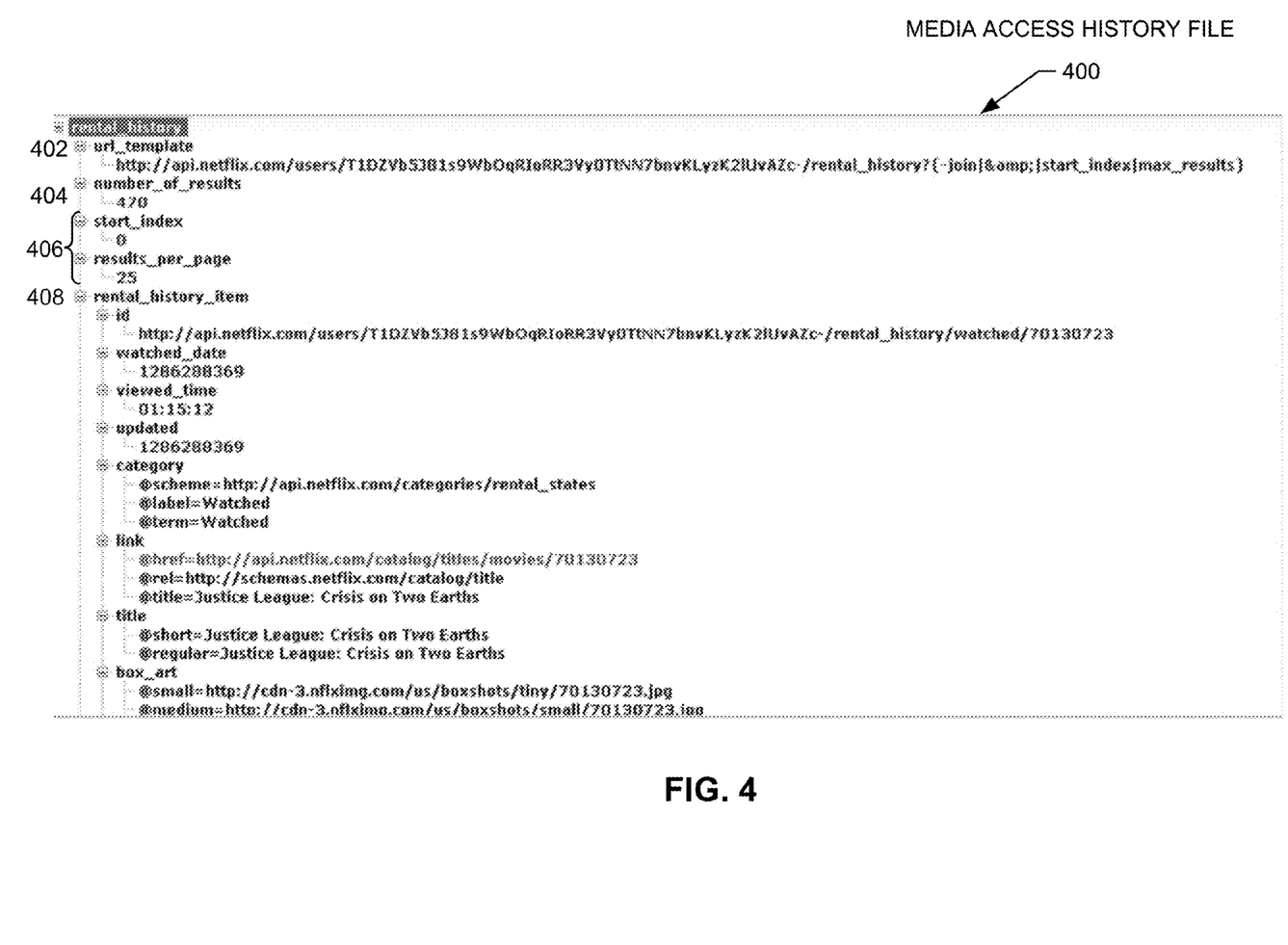
FIG. 4 illustrates an example access history information file representative of subscriber access history that may be retrieved by the example online media monitor of FIGS. 1 and/or 2.

In the example of FIG. 2, the information retriever 210 retrieves access history files, such as the access history file 400 of FIG. 4, from the subscriber information API 154. In some examples, the information retriever 210 uses an access history link (e.g., the second link 316 of FIG. 3) from a subscriber information file. The example media access history manager 240 manages the media access history database 250 using the information from the access history file 400. The example access history file includes an example universal resource locator (URL) 402, an example number results 404, example settings (e.g., "start_index," "results_per_page," etc.) 406, and example access history item(s) 408. In some examples, a most recent media item requested and/or viewed (e.g., the media item 408) is provided. In some examples, the access history information includes playback information of an example media item (e.g., the media item 408). In some examples, the playback information includes a resume location indicating a point of the media file at which the media presentation is to resume upon execution of the media file. In some examples, the access history information file 400 identifies a media delivery type indicating whether the media was electronically provided to subscribers, provided as physical media to subscribers, and/or provided via another delivery vehicle or technology. In some examples, the access history information file 400 includes a device identifier that identifies which device (e.g., which of the device(s) 122, 124, 126, and/or 128) requested and/or presented the media.

In some examples, the media access history manager 240 instructs the information retriever 210 to retrieve access history information of one or more subscribers from the subscriber information API 154. In some such examples, the media access history manager 240 instructs the information retriever 210 based on settings of the online media monitor 110. For example, the media access history manager 240 may identify media data representative of media that has not yet been stored in the media access history database 250 (e.g., a particular movie, such as "Justice League: Crisis on Two Earths," was identified for the first time). In such examples, the media access history manager 240 may instruct the information retriever 210 to request access history information to identify whether other subscribers (e.g., subscribers identified in the credential database 230) have requested and/or viewed the same media.

The example ratings generator 260 of FIG. 2 determines ratings information based on the access history information stored in the media access history database 250 using any suitable technique. In some examples, the ratings generator 260 determines ratings for media based on access history from a specific time period. In some examples, the ratings generator 260 determines ratings for media based on a total number of media accesses, requests, downloads, etc. In some examples, the ratings information is based on demographics, location, etc. of corresponding subscribers associated with the access history information stored in the media access history database 250. Accordingly, the ratings generator 260 may determine ratings information by combining access history information from a plurality of subscribers identified in the access history database. Statistical methods may be used to project the characteristics of the panelist audience (e.g., subscribers who authorized access to their access history) to one or more populations of interest.

While an example manner of implementing the online media monitor 110 of FIG. 1 is illustrated in FIG. 2, one or more of the elements, processes and/or devices illustrated in FIG. 2 may be combined, divided, re-arranged, omitted, eliminated and/or implemented in any other way. Further, the example information retriever 210, the example credential manager 220, the example credential database 230, the example media access history manager 240, the example media access history database 250, the example ratings generator 260 and/or, more generally, the example online media monitor 110 of FIG. 2 may be implemented by hardware, software, firmware and/or any combination of hardware, software and/or firmware. Thus, for example, any of the example information retriever 210, the example credential manager 220, the example credential database 230, the example media access history manager 240, the example media access history database 250, the example ratings generator 260 and/or, more generally, the example online media monitor 110 of FIG. 2 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example information retriever 210, the example credential manager 220, the example credential database 230, the example media access history manager 240, the example media access history database 250, and/or the example ratings generator 260 is/are hereby expressly defined to include a tangible computer readable storage device or storage disk such as a memory, a digital versatile disk (DVD), a compact disk (CD), a Blu-ray disk, etc. storing the software and/or firmware. Further still, the example online media monitor 110 of FIG. 1 may include one or more elements, processes and/or devices in addition to, or instead of, those illustrated in FIG. 2, and/or may include more than one of any or all of the illustrated elements, processes and devices.

Figure 5:
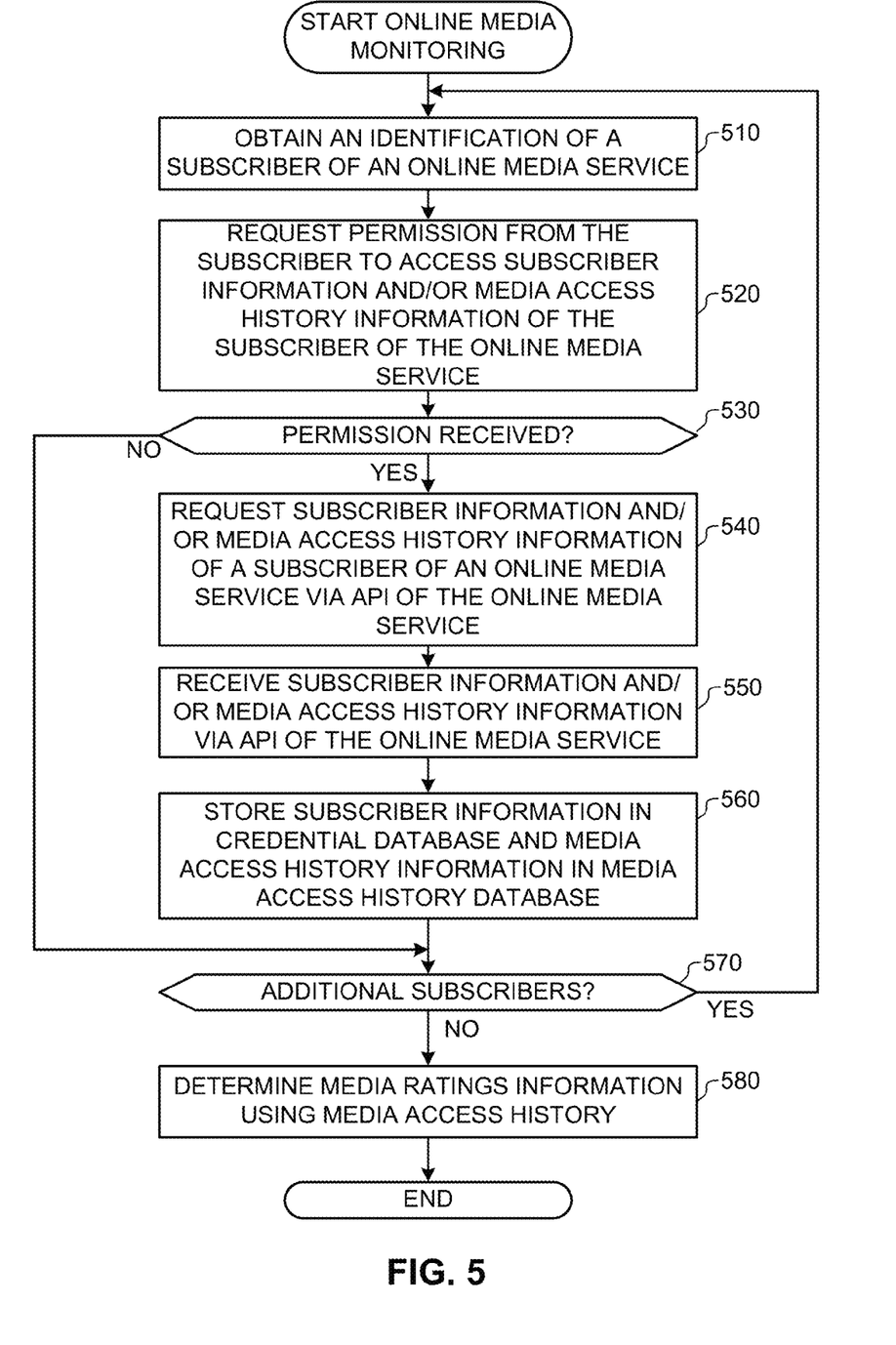
FIG. 5 is a flowchart representative of example machine readable instructions that may be executed to implement the example online media monitor of FIGS. 1 and/or 2.

A flowchart representative of example machine readable instructions for implementing the online media monitor 110 of FIG. 2 is shown in FIG. 5. In this example, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 5, many other methods of implementing the example online media monitor 110 may alternatively be used. For example, the order of execution of the blocks may be changed, and/or some of the blocks described may be changed, eliminated, or combined.

As mentioned above, the example processes of FIG. 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIG. 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

The program 500 of FIG. 5 begins with an initiation of the example online media monitor 110 of FIG. 1 (e.g. in response to a measurement entity requesting ratings for media provided via an online media service). At block 510, the example information retriever 210 obtains an identification (e.g., a subscriber ID, a username, etc.) of a subscriber of an online media service (e.g., one of the media distributor(s) 150, such as Netflix, Hulu, YouTube, etc.) associated with one of the media distributors 150. In some examples, the information retriever 210 obtains the identification of the subscriber via the credential manager 220 and/or credential database 230. In some examples, the information retriever 210 obtains the identification of the subscriber from a user of the online media monitor 110. At block 520 of FIG. 5, the information retriever 210 requests permission from the subscriber to access subscriber information and/or access history information of the subscriber of the online media service. In some examples, the information retriever 210 requests subscriber permission using an online media service application (e.g., a Netflix application, a Hulu application, a YouTube application, etc.) executing on a media presentation device (e.g., one or more of the device(s) 122, 124, 126, and/or 128). In some examples, the information retriever 210 requests an API (e.g., the subscriber information API 154 of FIG. 1) of the online media service to request subscriber permission to access the information. In some examples, when a subscriber has already authorized permission prior to block 520, the information retriever 510 may identify the permission in the media access history database 250. At block 530 of the illustrated example, the information retriever 210 determines whether permission was received. If permission was not received, control advances to block 570. If permission was received, control advances to block 540. In some examples, blocks 520 and 530 are not executed when the obtained identification of the subscriber is associated with a subscriber that has already granted permission to access history information of the subscriber (e.g., the subscriber information is already stored in the credential database 230). In such examples, control advances directly from block 510 to block 540.

At block 540 of the illustrated example of FIG. 5, the information retriever 210 requests subscriber information and/or access history information of the subscriber of the online media service via an API (e.g., the subscriber information API 154 of FIG. 1) of the online media service. At block 550 of FIG. 5, the credential manager 220 receives subscriber information and the media access history manager 240 receives access history information via the API of the online media service. At block 560, the credential manager 220 stores the subscriber information in the credential database 230 and the media access history manager 240 stores the access history information in the media access history database 250.

In the illustrated example of FIG. 5, at block 570 the online media monitor 110 determines whether the information retriever 210 is to retrieve subscriber information and/or access history information from additional subscribers. In some examples, the online media monitor 110 uses the credential manager 220 to determine whether information has been retrieved from all subscribers identified in the credential database 230. In some examples, the online media monitor 110 determines via an API (e.g., the subscriber information API 154 of FIG. 1) of an online media service whether there are additional subscribers that can be queried for permission to access subscriber information and/or access history information of the additional subscribers. If the online media monitor 110 determines that there are additional subscribers (block 570), control returns to block 510. If the online media monitor 110 determines that there are not additional subscribers, control advances to block 580.

At block 580 of the illustrated example of FIG. 5, the ratings generator 260 determines media ratings information using the subscriber information and/or the access history information from the credential database 230 and/or media access history database 250, respectively. After block 580, the program 500 ends.

Figure 6:
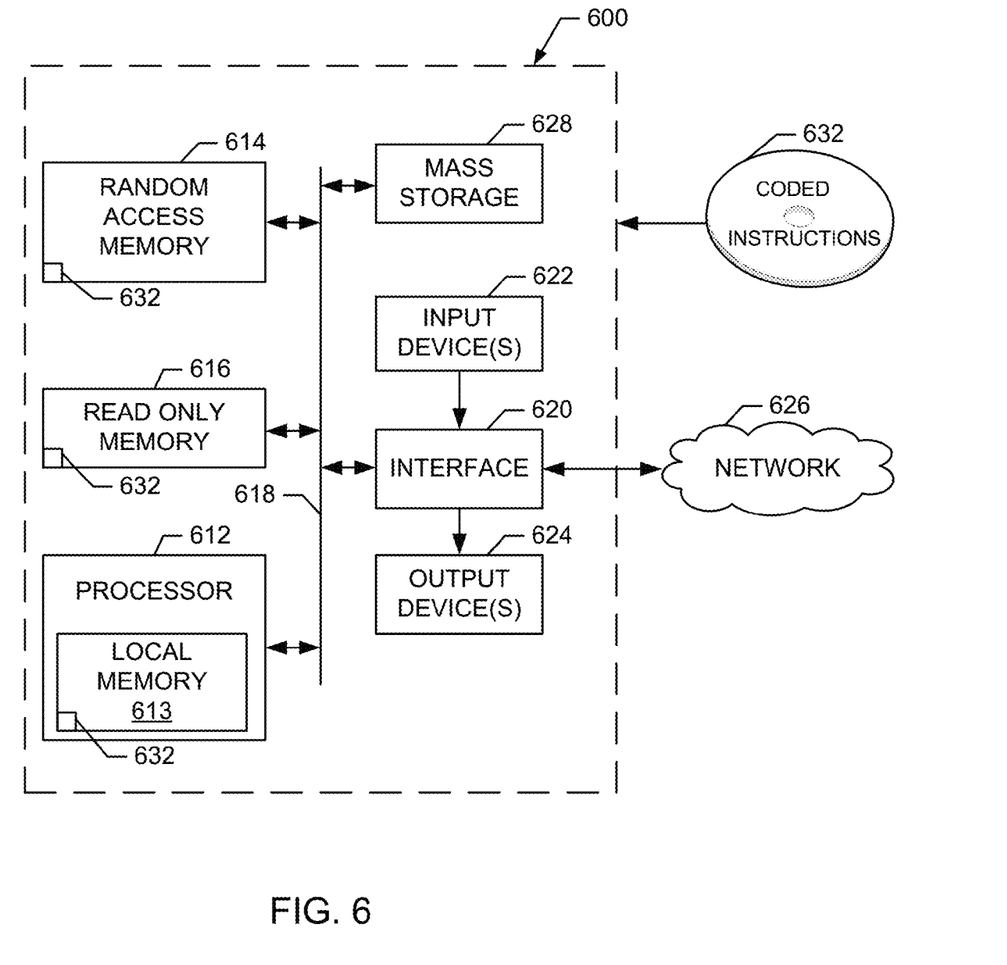
FIG. 6 is a block diagram of an example processing platform capable of executing the machine readable instructions of FIG. 6 to implement the example online media monitor of FIGS. 1 and/or 2.

FIG. 6 is a block diagram of an example processor platform 600 capable of executing the instructions of FIG. 5 to implement the online media monitor 110 of FIG. 2. The processor platform 600 can be, for example, a server, a personal computer, a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a subscriber to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a light emitting diode (LED), a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIG. 5 may be stored in the mass storage device 628, in the volatile memory 614, in the non-volatile memory 616, and/or on a removable tangible computer readable storage medium such as a CD or DVD.

From the foregoing, it will be appreciated that the above disclosed methods, apparatus and articles of manufacture have been disclosed to determine ratings for online media services using subscriber information and access history. In examples disclosed herein, an audience measurement entity can measure an audience of media presented using online media services using application programming interfaces (APIs) of the online media service.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A method to determine media ratings information, comprising:
   in response to determining a subscriber of an online media service is not identified in a credential database, transmitting, by executing an instruction with a processor, a first request message requesting permission for subscriber information and an access history associated with the subscriber of the online media service;
   in response to receiving a response message indicative of the permission, transmitting, by executing an instruction with the processor, a second request message requesting the access history associated with the subscriber of the online media service via a programming interface for the online media service;
   in response to the second request message, receiving the access history associated with the subscriber;
   determining, by executing an instruction with the processor, ratings information for online media accessed via the online media service based on the access history and demographic information corresponding to the subscriber information;
   projecting, by executing an instruction with the processor, the ratings information corresponding to the subscriber information to a population; and
   outputting the projection.

2. The method as defined in claim 1, further including obtaining an identification of the subscriber corresponding to the online media service, wherein the first request message requesting the permission requests the permission from the subscriber, and the transmitting of the second request message requesting the access history includes transmitting the identification of the subscriber via the programming interface.

3. The method as defined in claim 1, wherein the access history includes a list of the online media that has been requested by the subscriber using the online media service.

4. The method as defined in claim 3, wherein the list includes physical media and digitally-delivered media, the list identifying a media delivery type for the media in the list.

5. The method as defined in claim 1, wherein the access history includes an identification of a most recent one of the online media item requested by the subscriber using the online media service.

6. The method as defined in claim 5, wherein the access history further identifies a resume location of the most recent media item.

7. The method as defined in claim 1, wherein the determining of the ratings information includes combining media in the access history with media in media access histories of additional subscribers of the online media service.

8. The method as defined in claim 1, further including identifying the demographic information of the subscriber via the programming interface.

9. The method as defined in claim 1, further including identifying the demographic information of the subscriber from panelist information of an audience measurement entity.

10. An apparatus, comprising:
    a credential manager to determine whether a subscriber of an online media service is identified in a credential database;
    an information retriever to:
      in response to the crediting manager determining a subscriber of an online media service is not identified in the credential database, transmit a first request message requesting permission for demographic information and access history associated with the subscriber; and
      after obtaining the permission, transmit a second request message requesting the access history of the subscriber of the online media service via an application programming interface of the online media service; and
    a ratings generator to:
      determine ratings information for at least one of online media or physical media identified in the access history based on the access history and the demographic information of the subscriber; and
      project the ratings information onto a population, at least one of the credential manager, the information retriever, or the ratings generator implemented by a processor.

11. The apparatus as defined in claim 10, wherein the credential manager is to provide an identification of the subscriber corresponding to the online media service to the information retriever, and the information retriever is to include the identification of the subscriber in the second request message requesting the access history via the programming interface.

12. The apparatus as defined in claim 11, wherein the credential manager is to receive permission from the subscriber to collect the access history.

13. The apparatus as defined in claim 10, wherein the information retriever is to retrieve the demographic information from panelist information of an audience measurement entity.

14. A tangible machine readable storage medium comprising machine readable instructions which, when executed, cause a machine to at least:
in response to determining a subscriber is not in a credential database, transmit a first request message requesting subscriber permission to access subscriber information and an access history associated with the subscriber;
transmit a second request message requesting the access history of the subscriber of the online media service via a programming interface for the online media service;
in response to the second request message, receiving the access history associated with the subscriber;
determine ratings information for online media accessed via the online media service based on the access history and the demographic information corresponding to the subscriber information;
project the ratings information corresponding to the subscriber information to a population of interest; and
output the projection.

15. The storage medium as defined in claim 14, wherein the instructions are further to cause the machine to:
obtain an identification of the subscriber corresponding to the online media service, wherein the first request message requesting the permission requests the permission from the subscriber, and the transmitting of the second request message requesting the access history includes transmitting the identification of the subscriber via the programming interface.

16. The storage medium as defined in claim 15, wherein the access history includes a list of the online media that has been requested by the subscriber using the online media service.

17. The storage medium as defined in claim 14, wherein the determining of the ratings information includes combining media in the access history with media in media access histories of additional subscribers of the online media service.

18. The storage medium as defined in claim 14, wherein the instructions, when executed, further cause the machine to identify the demographics information via the programming interface.

19. The storage medium as defined in claim 14, wherein the instructions, when executed, further cause the machine to identify the demographics information from panelist information of an audience measurement entity.

* * * * *